Nov. 19, 1957  J. B. SCHOFIELD  2,813,969
ANTI-GLARE HEADLAMPS
Filed Oct. 1, 1953  2 Sheets-Sheet 1

INVENTOR
James B. Schofield
BY Shoemaker & Mattare
ATTORNEYS

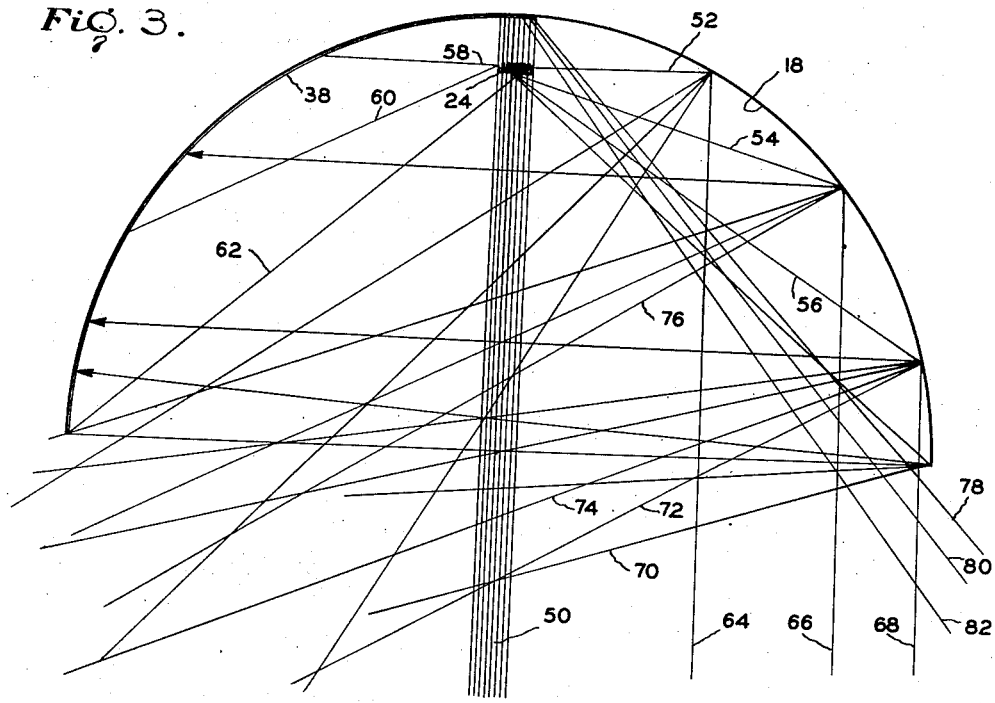
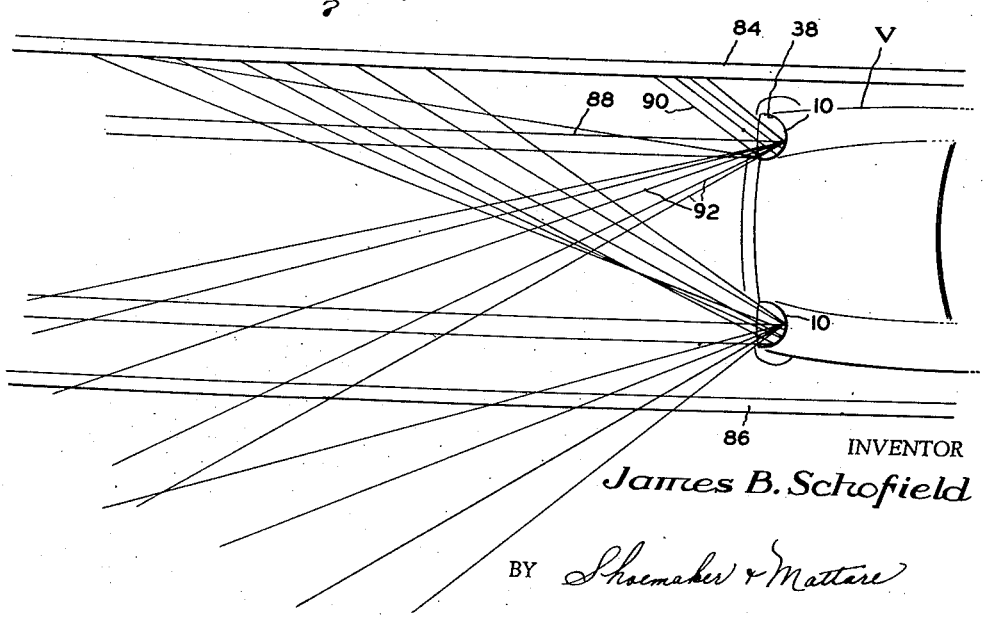

United States Patent Office 2,813,969
Patented Nov. 19, 1957

2,813,969

ANTI-GLARE HEADLAMPS

James B. Schofield, Roslindale, Mass.

Application October 1, 1953, Serial No. 383,459

5 Claims. (Cl. 240—7.1)

The present invention relates to anti-glare headlamps and more particularly to a vehicle headlamp such as of the sealed beam type wherein the rear reflective member has a vertical semi-section thereof rendered non-reflective so as to minimize objectionable glare commonly encountered by vehicles passing in an opposite direction.

The primary object of the present invention is to provide an improved vehicle headlamp wherein the rear reflective member is provided with both reflective and non-reflective surfaces so that the light rays reflected by the headlamp rear member will primarily traverse paths ranging from substantially straight ahead to around to a road side direction.

Another object of the present invention is to so form the rear reflective member of a vehicle headlamp that the glare produced thereby will diminish as an oncoming vehicle approaches.

The means by which the present invention is accomplished includes the provision in a substantially conventional headlamp construction of a rear reflective member having vertical road side adjacent and road center adjacent semi-sections, the road side adjacent section having a surface coating rendering the same non-reflective whereas the road center adjacent semi-section is reflective in nature. The margin of the non-reflective road side adjacent semi-section is convexly arcuated so that maximum non-glare reflection is made possible while maintaining at a minimum objectionable glare to an oncoming vehicle. The headlamp of course includes the conventional light source such as high and low beam filaments with means adapted to be connected to the electrical system of a vehicle. Additionally, the headlamp includes a transparent cover member which in the present disclosure is of the type secured to the rear concave reflective member with a hermetic seal. I have found that for best results the transparent cover member must be of the type having protuberances or other light-reflecting media on a surface thereof, preferably the inner surface.

In the drawings:

Fig. 3 is a diagrammatic view showing the manner in which the light rays from the filament of the headlamp are reflected from the reflective surface of the rear member and non-reflected by the non-reflective surface of the rear member so that most of the rays are in a straight ahead or roadside direction;

Fig. 4 is a diagrammatic view showing a vehicle equipped with headlamps in accordance with the present invention and showing the disposition of reflected light rays issuing from the headlamps of the vehicle.

Figure 1:
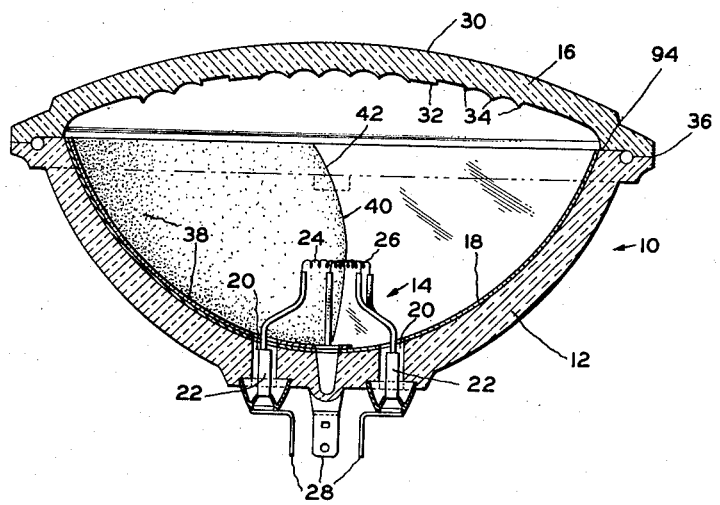
Fig. 1 is a vertical horizontal sectional view through a headlamp having the improved means of the present invention incorporated therein.
Figure 2:
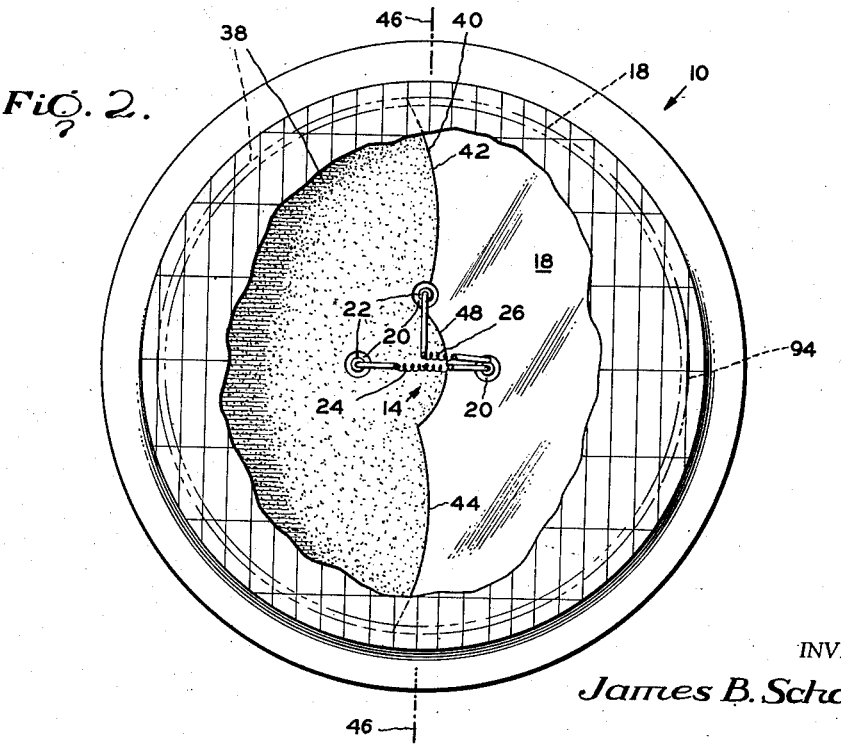
Fig. 2 is a front elevational view of the headlamp of Fig. 1.

Referring more particularly to the drawings, it will be seen that in Figs. 1 and 2, an improved headlamp 10 is disclosed as comprised of a rear concave member 12 having a light source 14 carried thereby and a transparent cover member 16 hermetically sealed thereto. It will be noted that the headlamp construction 10 with the exception of the improvement of the present invention incorporated therein is substantially conventional. Reference is made to Patents Nos. 2,148,314 and 2,148,315 issued to D. K. Wright which disclose headlamps of the type which could have embodied therein the improvement of the present invention.

It is sufficient to note that the rear concave member 12 is made of glass or other suitable material having a reflective coating 18 on its inner surface and is formed with suitable openings at 20 through which terminal members 22 can be engaged for conveying current to the filaments 24 and 26. The terminal members 22 have brackets 28 secured thereto, which brackets are adapted to be electrically connected in the electrical system of a vehicle. The transparent cover member 16 may also be made of glass and has a convex, substantially smooth outer surface 30 and an inner surface 32 which is formed with a multiplicity of protuberances such as is shown at 34, although other light-refracting media can be employed if so desired. However, I have found that the cover member such as is shown at 16 works especially well with the improvement of the present invention. The front and rear members 16 and 12 are secured together at their peripheries at 36 and the assembly is evacuated and filled with suitable inert gas as is conventional.

As is well known, in conventional headlamps wherein there is a rear member 12 which is completely reflective, a vehicle approaching in an opposite direction is subjected to substantial objectionable glare which in many instances has caused accidents. Heretofore, attempt has been made to provide such headlamps either with shields or non-reflective surface portions. However, so far as I am aware, there has been no arrangement which will effectively minimize objectionable glare while maintaining a maximum of desirable reflection.

In accomplishing my invention, I have provided the inner concave surface of the rear reflective member 12 with a non-reflective coating 38 which covers substantially a semi-section to the left of the vertical center line of the headlamp, which semi-section is the normally road side adjacent semi-section of the headlamp. It is to be especially noted that the inner margin 40 of the non-reflective surface 38 includes upper and lower convexly arcuated portions 42 and 44 which are disposed adjacent the vertical axis 46 of the headlamp 10. The upper and lower marginal portions 42 and 44 are joined by a medial convexly arcuated portion at 48, which medial portion is in the zone of the light source of the headlamp.

Referring now to Figs. 3 and 4, it will be seen that the light rays issuing from the filament 24 which represents either of the filaments of the headlamp, traverse paths including the straight ahead path as at 50 and other paths to the right and left of the straight ahead path 50, as for example at 52, 54, 56 and 58, 60 and 62. Of the rays passing from the filament to the non-reflective surface at 38, there are none reflected because of the absorption of these rays. Of the rays passing from the filament to the reflective surface at 18, some of these rays will be reflected in a straight ahead direction as at 64, 66 and 68 while still others of these rays will be reflected toward the road side, examples of the latter rays being shown at 70, 72, 74 and 76. There will, of course, be some rays issuing from the filament which will strike neither the reflective surface at 18 nor the non-reflective surface at 38 and some of these rays will pass toward the road side and others of these rays will pass toward the road center as at 78, 80 and 82. It will be realized, however, that these rays are not highly objectionable and are at a minimum.

In Fig. 4, a vehicle V is shown passing along a roadway with the road side at 84 and the center line at 86. A pair of headlamps 10 will have a light ray pattern set up thereby in accordance with the arrangement shown in Fig. 3 and because of the non-reflective surface at 38, there will be no reflection of the light rays from the filament from the non-reflective vertical semi-section adjacent the road side toward the center strip 86 and any vehicles coming in an opposite direction. The great preponderance of light rays will pass from the filament to the reflective surface at 18 and either straight ahead or toward the road side as shown at 88 and 90 with a minor portion of the light rays passing directly from the filament toward the center strip as at 92. It is to be particularly noted that as a vehicle coming in an opposite direction approaches the vehicle V light rays issuing from the latter vehicle and crossing the center strip 86 will decrease as the vehicles close the distance between themselves, thus avoiding the occurrence of that blind spot when two vehicles passing in opposite directions are closely adjacent each other.

Having reference again to Fig. 2, it is to be noted that with the arcuation of the margin at 42, 44 and 48, maximum reflection of the light rays without glare is permitted. This can be understood if one considers the disposition of a pair of vehicles traveling in opposite directions but closely adjacent each other. The angular relation between the vehicles when they are at a certain distance from each other will be such that the curve substantially defined by the margin 40 will coincide with the edge portion of the rear member as at 94, in which relationship the vehicle facing the headlamps provided with non-reflective surfaces such as 38 will receive light rays limited to those passing directly from the filament, none of the light rays being reflected because of the concealment of the reflective surface 18.

In view of the foregoing, it is believed that I have provided a vehicle headlamp which will fulfill the objects hereinbefore set forth. It will be realized, however, that my invention need not be confined to a headlamp of the type disclosed herein. On the other hand, it is to be noted that by utilizing a front transparent element such as disclosed herein best results are obtained.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. In combination with an automotive vehicle, a headlamp mounted on the front of said vehicle, said headlamp comprising a rear member having a concaved surface presented forwardly, a source of light disposed centrally of the concaved surface of said rear member in front thereof and at a point in the axial line of said concaved surface, a transparent front member constituting a lens and having marginal portions connected with marginal portions of the rear member by a sealed joint and together therewith defining a sealed chamber in which the source of light is located in front of and adjacent the said rear member, said rear member having its concaved front surface provided with vertically extending semi-circular side sections disposed in side-by-side relation to each other, the said side sections meeting along substantially the vertical diameter of the rear member, one side section being continuously reflective throughout its area and the other side section being continuously non-reflective throughout its area, said one section being disposed on that side of said vertical diameter toward the road center side of the vehicle, whereby light will be reflected predominantly toward the near road side of the vehicle.

2. In combination with an automotive vehicle, a headlamp mounted on the front of said vehicle, said headlamp including a concave reflector and a source of light at the center thereof, said source of light being disposed at a point in the axial line of said concave reflector, said reflector having a pair of side sections constituting the entire effective area of the reflector and disposed in side-by-side relation to each other and meeting along a vertical diameter of the reflector extending through the center of the source of light, one of said sections having a reflective surface throughout its entire area for directing light rays diagonally toward the adjacent side of a road and the other section having a nonreflective surface throughout its entire area serving to prevent glaring light rays from being directed across the center of the road into eyes of the driver of an approaching vehicle.

3. In combination with an automotive vehicle, a headlamp mounted on the front of said vehicle, said headlamp including a concave reflector having side sections meeting along a vertically extending diameter of the reflector, one side section being reflective throughout its area and the other side section being nonreflective throughout its area, said one side section being disposed on that side of the said vertically extending diameter of the reflector toward the road center side of the vehicle, whereby light will be reflected predominantly toward the near road side of the vehicle, and a source of light disposed at a point along the axial line of said reflector.

4. In combination with an automotive vehicle, a headlamp mounted on the front of said vehicle, said headlamp comprising a rear concave member having a light source carried thereby at a point in the axial line of such member, a transparent cover member secured to said rear member, said rear member being divided along substantially its vertical diameter to provide vertical road side-adjacent and road center-adjacent semisections, in side-by-side relation to each other, the latter section having a reflective surface coating throughout its entire area for directing light rays toward a side of the road, and the former section having a nonreflective surface coating preventing glaring light rays from being reflected into eyes of the driver of an approaching vehicle, said vertical road side-adjacent semisection having its inner margin adjacent the vertical axis of the headlamp provided with convexly arcuated upper and lower portions.

5. In combination with an automotive vehicle, a headlamp mounted on the front of said vehicle, said headlamp comprising a rear concave member having a light source carried thereby at a point in the axial line of such concave surface, a transparent cover member secured to said rear member, said rear member being divided substantially along its vertical center line to provide vertical road side-adjacent and road center-adjacent semisections, the latter section having a reflective surface coating throughout its entire area for directing light rays toward the side of the road, and the former section having a nonreflective surface coating preventing glaring light rays from being reflected into eyes of the driver of an approaching vehicle, said vertical road side-adjacent semisection having upper and lower marginal portions adjacent the vertical axis of the headlamp convexly arcuated and joined by a medial convexly arcuated marginal portion concentric with the center of the rear concave member and of appreciably less length than its upper and lower portions.

References Cited in the file of this patent

UNITED STATES PATENTS

| 1,718,856 | Durfee | June 25, 1929 |
| 1,950,083 | Grant | Mar. 6, 1934 |

FOREIGN PATENTS

| 347,482 | Great Britain | Apr. 30, 1931 |